US011381087B2

(12) United States Patent
Chen et al.

(10) Patent No.: US 11,381,087 B2
(45) Date of Patent: Jul. 5, 2022

(54) SMART GRID SYSTEM AND POWER MANAGEMENT METHOD THEREOF

(71) Applicant: DELTA ELECTRONICS, INC., Taoyuan (TW)

(72) Inventors: Sin-Hong Chen, Taoyuan (TW); Tsung-Han Tsai, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 147 days.

(21) Appl. No.: 17/023,408

(22) Filed: Sep. 17, 2020

(65) Prior Publication Data

US 2021/0281075 A1    Sep. 9, 2021

(30) Foreign Application Priority Data

Mar. 4, 2020   (CN) .......................... 202010144066.3

(51) Int. Cl.
*H02J 3/46* (2006.01)
*H02J 3/38* (2006.01)
*H02M 7/48* (2007.01)
*H02M 1/00* (2006.01)

(52) U.S. Cl.
CPC ........ *H02J 3/38* (2013.01); *H02J 3/46* (2013.01); *H02M 7/48* (2013.01); *H02J 2300/40* (2020.01); *H02M 1/007* (2021.05)

(58) Field of Classification Search
CPC ...... H02J 3/46; H02J 3/38; H02J 3/381; H02J 2300/40; H02M 7/48; H02M 1/007
See application file for complete search history.

(56) References Cited

U.S. PATENT DOCUMENTS

| 8,693,228 B2 | 4/2014 | Matan et al. |
| 9,142,965 B2* | 9/2015 | Grana ................. H02J 13/0003 |
| 2012/0169311 A1* | 7/2012 | Malmberg ............. H02J 1/102 |
| | | 323/272 |

(Continued)

FOREIGN PATENT DOCUMENTS

| CN | 103238270 A | 8/2013 |
| CN | 104659804 A | 5/2015 |

(Continued)

*Primary Examiner* — Harry R Behm
(74) *Attorney, Agent, or Firm* — CKC & Partners Co., LLC (57) ABSTRACT

A smart grid system includes a current sensor, and plural power conversion devices coupled to an AC grid. The current sensor measures a total current flowed through the AC grid, thereby providing a measured current value. The power conversion devices include a master power conversion device and plural slave power conversion devices. The master power conversion device receives the measured current value, thereby controlling an output power of the master power conversion device and providing a first duty cycle signal according to the measured current value. A first one of the slave power conversion devices which is coupled to the master power conversion device receive the first duty cycle signal, thereby controlling an output power of the first one of the slave power conversion devices according to the first duty cycle signal. The master power conversion device and the slave power conversion devices are communicated via a daisy chain connection.

20 Claims, 9 Drawing Sheets

(56) References Cited

U.S. PATENT DOCUMENTS

| | | |
|---|---|---|
| 2016/0079757 A1 | 3/2016 | Matan et al. |
| 2016/0087436 A1 | 3/2016 | Matan et al. |
| 2016/0087522 A1 | 3/2016 | Matan et al. |
| 2016/0204606 A1 | 7/2016 | Matan et al. |
| 2016/0241039 A1 | 8/2016 | Cheng et al. |
| 2017/0018932 A1 | 1/2017 | Pahlevaninezhad et al. |
| 2017/0047740 A1 | 2/2017 | Narla |
| 2017/0047741 A1 | 2/2017 | Narla |
| 2017/0047742 A1 | 2/2017 | Narla |
| 2017/0141579 A1* | 5/2017 | Kuwahara ............... H02J 3/472 |
| 2017/0294663 A1* | 10/2017 | Nishimori ............... H02J 3/387 |
| 2018/0159154 A1* | 6/2018 | Suzuki ............. H01M 8/04268 |
| 2019/0074694 A1 | 3/2019 | Matan et al. |
| 2020/0220381 A1* | 7/2020 | Lee .................... H02J 13/0093 |
| 2021/0288580 A1* | 9/2021 | Luo .................... H02M 3/1584 |
| 2021/0296892 A1 | 9/2021 | Matan et al. |

FOREIGN PATENT DOCUMENTS

| | | | |
|---|---|---|---|
| CN | 107925246 A | | 4/2018 |
| CN | 112838619 A | * | 5/2021 |
| TW | 201306435 A | | 2/2013 |
| TW | M579410 U | | 6/2019 |
| WO | 2016004433 A1 | | 1/2016 |

\* cited by examiner

SMART GRID SYSTEM AND POWER MANAGEMENT METHOD THEREOF

RELATED APPLICATIONS

This application claims priority to Chinese Patent Application No. 202010144066.3, filed Mar. 4, 2020, which is herein incorporated by reference.

BACKGROUND

Field of Invention

The present invention relates to a smart grid system. More particularly, the present invention relates to a smart grid system and a power management method thereof.

Description of Related Art

The known smart grid system requires a monitoring system, such as a remote control system (RCS), to monitor the power trading between the users and the power company, such that the power conversion devices of the users could be regulated by the power company. The aforementioned monitoring system needs to receive the electrical information of the main path measured by the power meter and to analyze the electrical information, and then transmits the corresponding command to each of the power conversion devices of the users through the communication manner (such as RS-485 or WiFi, etc.), such that the power conversion devices of the users could supply power that meets the demand. However, some users do not want to sell electricity (i.e., the supplying power is only for their own use), but the monitoring system is still required to prevent that power conversion device, which is not regulated by the power company, from accidentally supplying power to the power grid. Moreover, during the communication period of each power conversion device, the time delays of transmission, waiting, receiving, and polling are inevitable, and therefore the power conversion devices of the users may not able to respond immediately and thus could not regulate power within the stipulated time, thereby violating current regulatory requirements.

SUMMARY

The present invention provides a smart grid system applied to a load and an AC grid. The smart grid system includes a current sensor and plural power conversion devices. The current sensor is configured to measure a total current flowed through the AC grid and to correspondingly provide a measured current value. The power conversion devices are coupled to the AC grid and configured to supply power to the load. The power conversion devices include a master power conversion device and plural slave power conversion devices. The master power conversion device controls an output power of the master power conversion device and provides a first duty cycle signal according to the measured current value. A first one of the slave power conversion devices which is coupled to the master power conversion device is configured to receive the first duty cycle signal. The first one of the slave power conversion devices controls an output power of the first one of the slave power conversion devices according to the first duty cycle signal. The master power conversion device and the slave power conversion devices are communicated via a daisy chain connection.

In accordance with one or more embodiments of the invention, the first one of the slave power conversion devices further provides a second duty cycle signal according to the first duty cycle signal.

In accordance with one or more embodiments of the invention, a second one of the slave power conversion devices which is coupled to the first one of the slave power conversion devices is configured to receive the second duty cycle signal. The second one of the slave power conversion devices controls an output power of the second one of the slave power conversion devices according to the second duty cycle signal.

In accordance with one or more embodiments of the invention, each of the power conversion devices includes a DC input terminal, an AC output terminal, and a microcontroller. The DC input terminal is configured to receive a DC power. The AC output terminal is configured to output the output power which is an AC power. The microcontroller is configured to control the output power converted from the DC power.

In accordance with one or more embodiments of the invention, each of the power conversion devices further includes a current measuring terminal. The current measuring terminal of the master power conversion device is configured to receive the measured current value.

In accordance with one or more embodiments of the invention, the microcontroller of the master power conversion device is configured to control the output power outputted by the AC output terminal of the master power conversion device according to the measured current value.

In accordance with one or more embodiments of the invention, each of the power conversion devices further includes an I/O (input/output) terminal. The I/O terminal of the master power conversion device is configured to provide the first duty cycle signal. The I/O terminal of the first one of the slave power conversion devices is configured to provide the second duty cycle signal.

In accordance with one or more embodiments of the invention, the microcontroller of the first one of the slave power conversion devices is configured to control the output power outputted by the AC output terminal of the first one of the slave power conversion devices according to the first duty cycle signal.

In accordance with one or more embodiments of the invention, the master power conversion device determines a current direction of the total current according to the measured current value, and the master power conversion device controls the output power of the master power conversion device and provides the first duty cycle signal according to the current direction of the total current.

In accordance with one or more embodiments of the invention, the master power conversion device controls the output power of the master power conversion device and provides the first duty cycle signal by determining whether the measured current value is less than a current setting value.

The present invention further provides a power management method of a smart grid system. The power management method includes: measuring a total current flowed through a AC grid to provide a measured current value; receiving the measured current value through a master power conversion device of a plurality of power conversion devices coupled to the AC grid, in which the master power conversion device controls an output power of the master power conversion device and provides a first duty cycle signal according to the measured current value; and receiving the first duty cycle signal through a first one of a plurality of slave power conversion devices of the power conversion devices which is coupled to the master power conversion device. The first one of the slave power conversion devices controls an output power of the first one of the slave power conversion devices according to the first duty cycle signal. The power conversion devices are configured to supply power to the load. The master power conversion device and the slave power conversion devices are communicated via a daisy chain connection.

In accordance with one or more embodiments of the invention, the first one of the slave power conversion devices further provides a second duty cycle signal according to the first duty cycle signal.

In accordance with one or more embodiments of the invention, the power management method further includes: receiving the second duty cycle signal through a second one of the slave power conversion devices which is coupled to the first one of the slave power conversion devices. The second one of the slave power conversion devices controls an output power of the second one of the slave power conversion devices according to the second duty cycle signal.

In accordance with one or more embodiments of the invention, the master power conversion device determines a current direction of the total current according to the measured current value, and the master power conversion device controls the output power of the master power conversion device and provides the first duty cycle signal according to the current direction of the total current.

In accordance with one or more embodiments of the invention, when the current direction of the total current is toward the load, the master power conversion device increases a duty ratio of the first duty cycle signal. When the current direction of the total current is not toward the load, the master power conversion device decreases the duty ratio of the first duty cycle signal.

In accordance with one or more embodiments of the invention, after increasing or decreasing the duty ratio of the first duty cycle signal, the master power conversion device determines the current direction of the total current again. When the current direction of the total current is toward the load, the master power conversion device does not adjust the duty ratio of the first duty cycle signal. When the current direction of the total current is not toward the load, the master power conversion device decreases the duty ratio of the first duty cycle signal.

In accordance with one or more embodiments of the invention, the master power conversion device controls the output power of the master power conversion device and provides the first duty cycle signal by determining whether the measured current value is less than a current setting value.

In accordance with one or more embodiments of the invention, when the measured current value is less than the current setting value, the master power conversion device increases a duty ratio of the first duty cycle signal. When the measured current value is not less than the current setting value, the master power conversion device decreases the duty ratio of the first duty cycle signal.

In accordance with one or more embodiments of the invention, after increasing or decreasing the duty ratio of the first duty cycle signal, the master power conversion device determines whether the measured current value is less than the current setting value again. When the measured current value is less than the current setting value, the master power conversion device does not adjust the duty ratio of the first duty cycle signal. When the measured current value is not less than the current setting value, the master power conversion device decreases the duty ratio of the first duty cycle signal.

In accordance with one or more embodiments of the invention, the first one of the slave power conversion devices determines whether the duty ratio of the first duty cycle signal is decreased. When the duty ratio of the first duty cycle signal is decreased, the first one of the slave power conversion devices decreases the output power of the first one of the slave power conversion devices. When the duty ratio of the first duty cycle signal is not decreased, the first one of the slave power conversion devices determines whether the output power of the first one of the slave power conversion devices reaches a maximum power of the first one of the slave power conversion devices. When the output power of the first one of the slave power conversion devices reaches the maximum power of the first one of the slave power conversion devices, the first one of the slave power conversion devices does not adjust the output power of the first one of the slave power conversion devices. When the output power of the first one of the slave power conversion devices does not reach the maximum power of the first one of the slave power conversion devices, the first one of the slave power conversion devices increases the output power of the first one of the slave power conversion devices.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
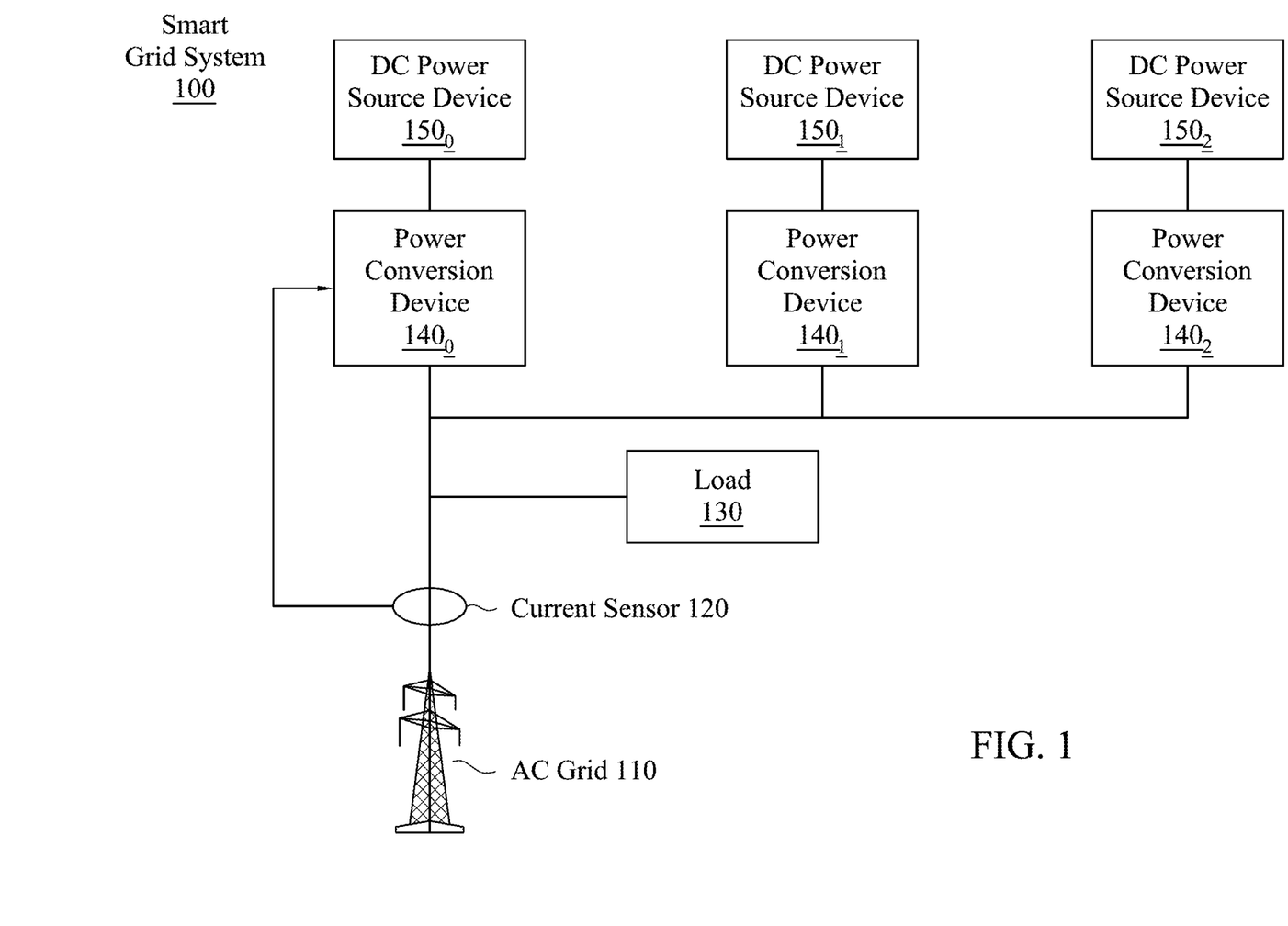
FIG. 1 illustrates a block diagram of a smart grid system according to some embodiments of the present invention.

FIG. 1 illustrates a block diagram of a smart grid system 100 according to some embodiments of the present invention. The smart grid system 100 includes an AC grid 110, a current sensor 120, a load 130, plural power conversion devices $140_0$, $140_1$, $140_2$, and plural DC power source devices $150_0$, $150_1$, $150_2$.

As shown in FIG. 1, the power conversion devices $140_0$, $140_1$, $140_2$ are coupled to the AC grid 110 and coupled to the load 130. In some embodiments of the present invention, the load 130 may be a general appliance load or any load that receives AC power. As shown in FIG. 1, the power conversion devices $140_0$, $140_1$, $140_2$ are coupled to the DC power source devices $150_0$, $150_1$, $150_2$, respectively. In some embodiments of the present invention, each of the DC power source devices $150_0$, $150_1$, $150_2$ may be a renewable power source, a secondary battery, or other device that can provide a DC power. In some embodiments of the present invention, the power conversion devices $140_0$, $140_1$, $140_2$ respectively receive the DC power from the DC power source devices $150_0$, $150_1$, $150_2$, such that each of the power conversion devices $140_0$, $140_1$, $140_2$ outputs a output power (i.e., an AC power) to the load 130.

As shown in FIG. 1, the current sensor 120 is coupled between the AC grid 110 and the power conversion device $140_0$. In some embodiments of the present invention, the current sensor 120 may be a current transformer (CT) or a hall sensor, the current sensor 120 is configured to measure a total current flowed through the AC grid 110 (i.e., the current flowed through the main path), thereby providing a measured current value to the power conversion device $140_0$. In some embodiments of the present invention, the measured current value provided by the current sensor 120 may be utilized to obtain a current direction of the total current of the AC grid 110.

Figure 2A:
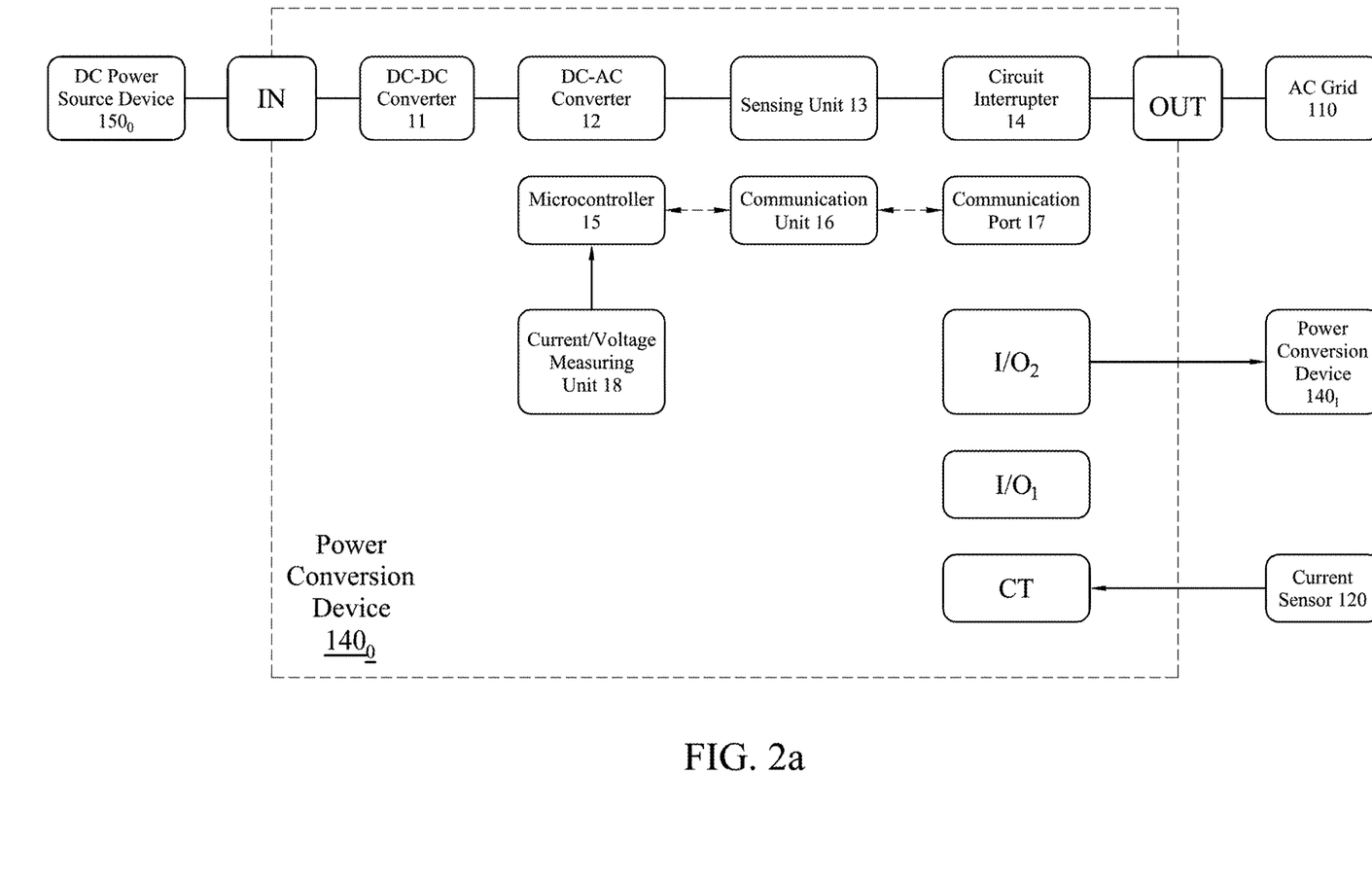
FIG. 2a illustrates a block diagram of the master power conversion device of the smart grid system according to some embodiments of the present invention.
Figure 2B:
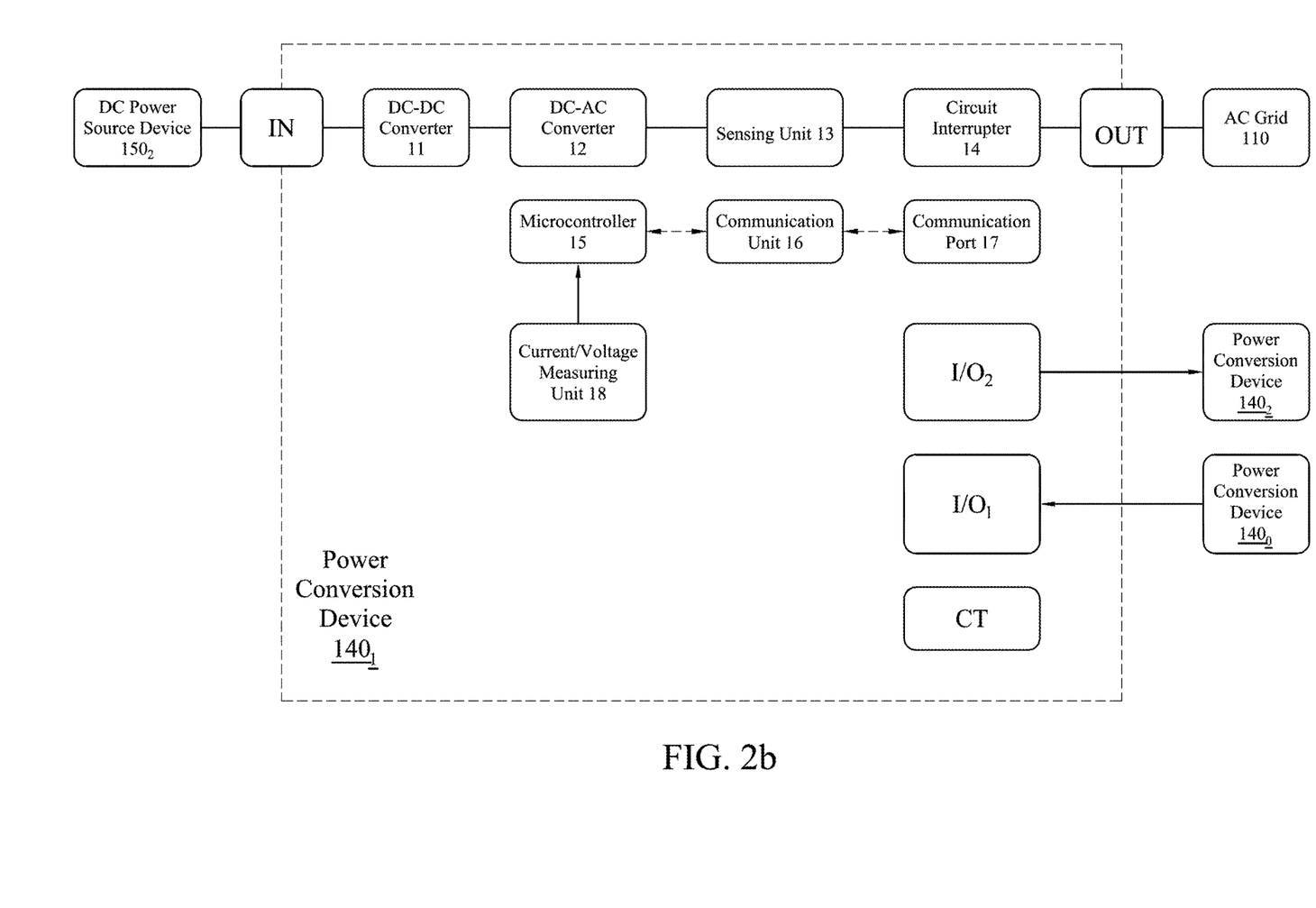
FIG. 2b illustrates a block diagram of the slave power conversion device of the smart grid system according to some embodiments of the present invention.
Figure 2C:
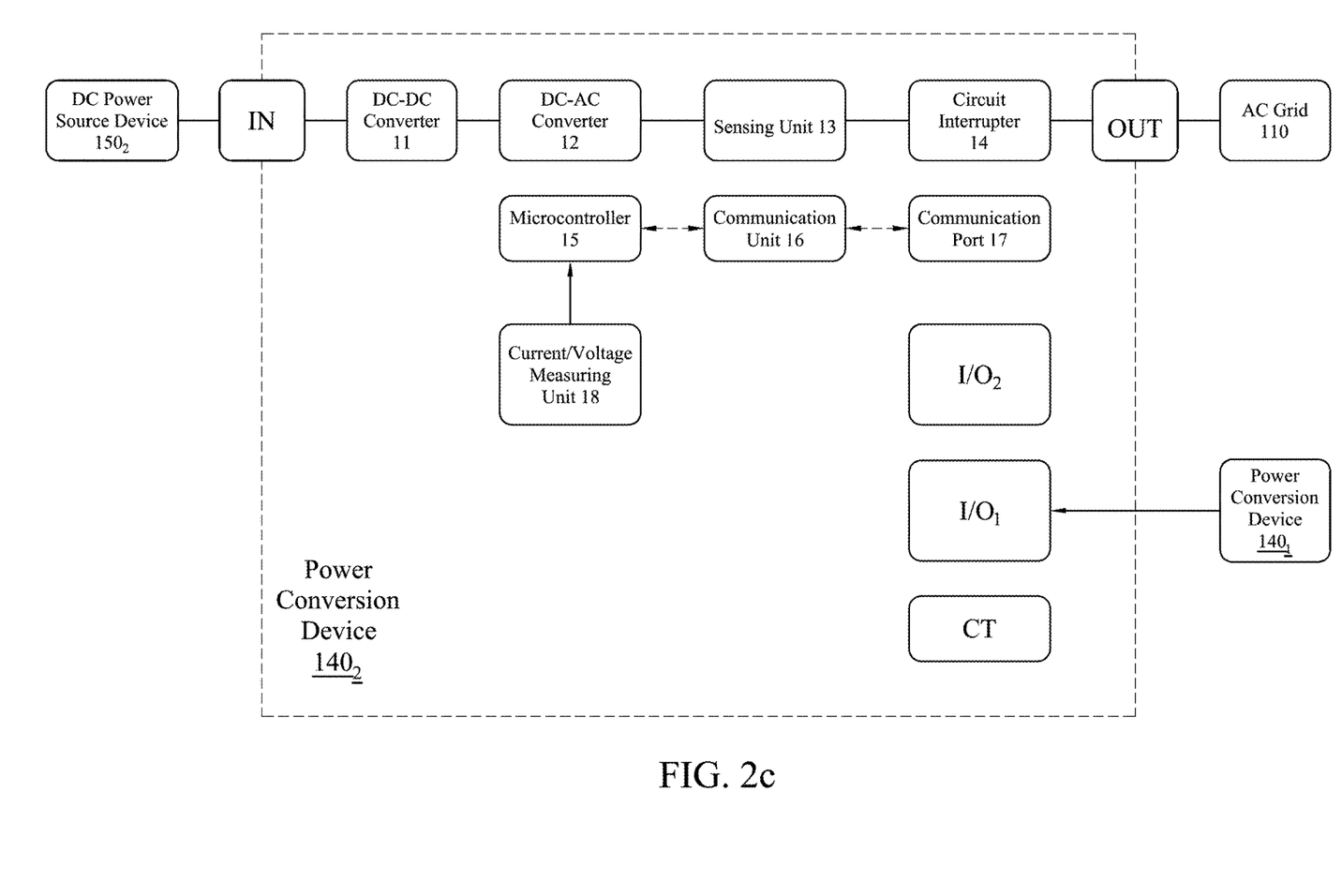
FIG. 2c illustrates a block diagram of the slave power conversion device of the smart grid system according to some embodiments of the present invention.

The power conversion devices $140_0$, $140_1$, $140_2$ include a master power conversion device $140_0$ and plural slave power conversion devices $140_1$ and $140_2$. FIG. 2a illustrates a block diagram of the master power conversion device $140_0$ of the smart grid system 100 according to some embodiments of the present invention. FIG. 2b illustrates a block diagram of the slave power conversion device $140_1$ of the smart grid system 100 according to some embodiments of the present invention. FIG. 2c illustrates a block diagram of the slave power conversion device $140_2$ of the smart grid system 100 according to some embodiments of the present invention.

It is noted that the number of the slave power conversion devices is not limited to two. More particularly, the number of the slave power conversion devices may vary with different application scenarios.

As shown in FIGS. 2a, 2b, and 2c, each of the master power conversion device $140_0$ and the slave power conversion devices $140_1$ and $140_2$ may include a DC-to-DC converter 11, a DC-to-AC converter 12, a sensing unit 13, a circuit interrupter 14 (e.g., as AC relay), a microcontroller 15, a communication unit 16, a communication port 17, a current/voltage measuring unit 18, two input/output (I/O) terminals $I/O_1$, $I/O_2$, and a current measuring terminal CT.

Each of the master power conversion device $140_0$ and the slave power conversion devices $140_1$ and $140_2$ may further include a DC input terminal IN and an AC output terminal OUT. The DC input terminals IN of the master power conversion device $140_0$ is disposed between the DC power source device $150_0$ and the DC-to-DC converter 11 of the master power conversion device $140_0$, and the master power conversion device $140_0$ receives the DC power outputted by the DC power source device $150_0$ via the DC input terminals IN of the master power conversion device $140_0$. The DC input terminals IN of the slave power conversion device $140_1$ is disposed between the DC power source device $150_1$ and the DC-to-DC converter 11 of the slave power conversion device $140_1$, and the slave power conversion device $140_1$ receives the DC power outputted by the DC power source device $150_1$ via the DC input terminals IN of the slave power conversion device $140_1$. The DC input terminals IN of the slave power conversion device $140_2$ is disposed between the DC power source device $150_2$ and the DC-to-DC converter 11 of the slave power conversion device $140_2$, and the slave power conversion device $140_1$ receives the DC power outputted by the DC power source device $150_1$ via the DC input terminals IN of the slave power conversion device $140_1$. The AC output terminal OUT of one of the master power conversion device $140_0$ and the slave power conversion devices $140_1$ and $140_2$ is disposed between the AC grid 110 and the circuit interrupter 14 of the one of the master power conversion device $140_0$ and the slave power conversion devices $140_1$ and $140_2$. The one of the master power conversion device $140_0$ and the slave power conversion devices $140_1$ and $140_2$ outputs the output power to the AC grid 110 via the AC output terminal OUT of the one of the master power conversion device $140_0$ and the slave power conversion devices $140_1$ and $140_2$.

The DC-to-DC converter 11 of the one of the master power conversion device $140_0$ and the slave power conversion devices $140_1$ and $140_2$ receives the DC power via the DC input terminals IN of the one of the master power conversion device $140_0$ and the slave power conversion devices $140_1$ and $140_2$, thereby performing a conversion process so as to output the converted DC power. For example, the DC-to-DC converter 11 is used for boosting the DC power. The DC-to-AC converter 12 of the one of the master power conversion device $140_0$ and the slave power conversion devices $140_1$ and $140_2$ converts the converted DC power outputted by the DC-to-DC converter 11 of the one of the master power conversion device $140_0$ and the slave power conversion devices $140_1$ and $140_2$ to the output power. The sensing unit 13 of the one of the master power conversion device $140_0$ and the slave power conversion devices $140_1$ and $140_2$ is configured to sense the output power outputted by the DC-to-AC converter 12 of the one of the master power conversion device $140_0$ and the slave power conversion devices $140_1$ and $140_2$. The circuit interrupter 14 of the one of the master power conversion device $140_0$ and the slave power conversion devices $140_1$ and $140_2$ is configured to determine whether the one of the master power conversion device $140_0$ and the slave power conversion devices $140_1$ and $140_2$ can normally output the output power outputted by the DC-to-AC converter 12 of the one of the master power conversion device $140_0$ and the slave power conversion devices $140_1$ and $140_2$. When the one of the master power conversion device $140_0$ and the slave power conversion devices $140_1$ and $140_2$ can normally output the output power outputted by the DC-to-AC converter 12 of the one of the master power conversion device $140_0$ and the slave power conversion devices $140_1$ and $140_2$, the circuit interrupter 14 of the one of the master power conversion device $140_0$ and the slave power conversion devices $140_1$ and $140_2$ turns on, such that the output power is outputted from the AC output terminal OUT of the one of the master power conversion device $140_0$ and the slave power conversion devices $140_1$ and $140_2$, and therefore the output power is merged into the AC grid 110.

The current/voltage measuring unit 18 of the one of the master power conversion device $140_0$ and the slave power conversion devices $140_1$ and $140_2$ is configured to measure the current/voltage that needs to be measured inside the one of the master power conversion device $140_0$ and the slave power conversion devices $140_1$ and $140_2$. The current/voltage measuring unit 18 of the one of the master power conversion device $140_0$ and the slave power conversion devices $140_1$ and $140_2$ transmits the measured current/voltage to the microcontroller 15 of the one of the master power conversion device $140_0$ and the slave power conversion devices $140_1$ and $140_2$. The microcontroller 15 of the one of the master power conversion device $140_0$ and the slave power conversion devices $140_1$ and $140_2$ multiplies the received current and the received voltage to obtain power information of the one of the master power conversion device $140_0$ and the slave power conversion devices $140_1$ and $140_2$.

The microcontroller 15 may be one of a micro control unit (MCU), a microprocessor unit (MPU), an application-specific integrated circuit (ASIC), and a system on a chip (SoC).

The conventional smart grid system provides the aforementioned power information (or the current/voltage information) to the monitoring system, such as a remote control system (RCS), via the communication unit 16 of each of the power conversion devices. The communication unit 16 is connected to the monitoring system via a wireless communication manner (e.g., WiFi) or a wired communication manner (e.g., RS-485 or CAN bus). Therefore, the power conversion devices are communicated with the management center (e.g., a private-owned or state-owned power company or a power business organization), and thus the management center may perform electric power dispatching or electric power management, thereby realizing the control, integration and management of the power information of the smart grid system. However, some users do not want to sell electricity (i.e., the supplying power is only for their own use), in such case, for the communication manner of the conventional smart grid system, the time delays of transmission, waiting, receiving, and polling are inevitable during the period of communication, and therefore the power company may not able to respond immediately and thus could not regulate power within the stipulated time, thereby violating current regulatory requirements.

Figure 3:
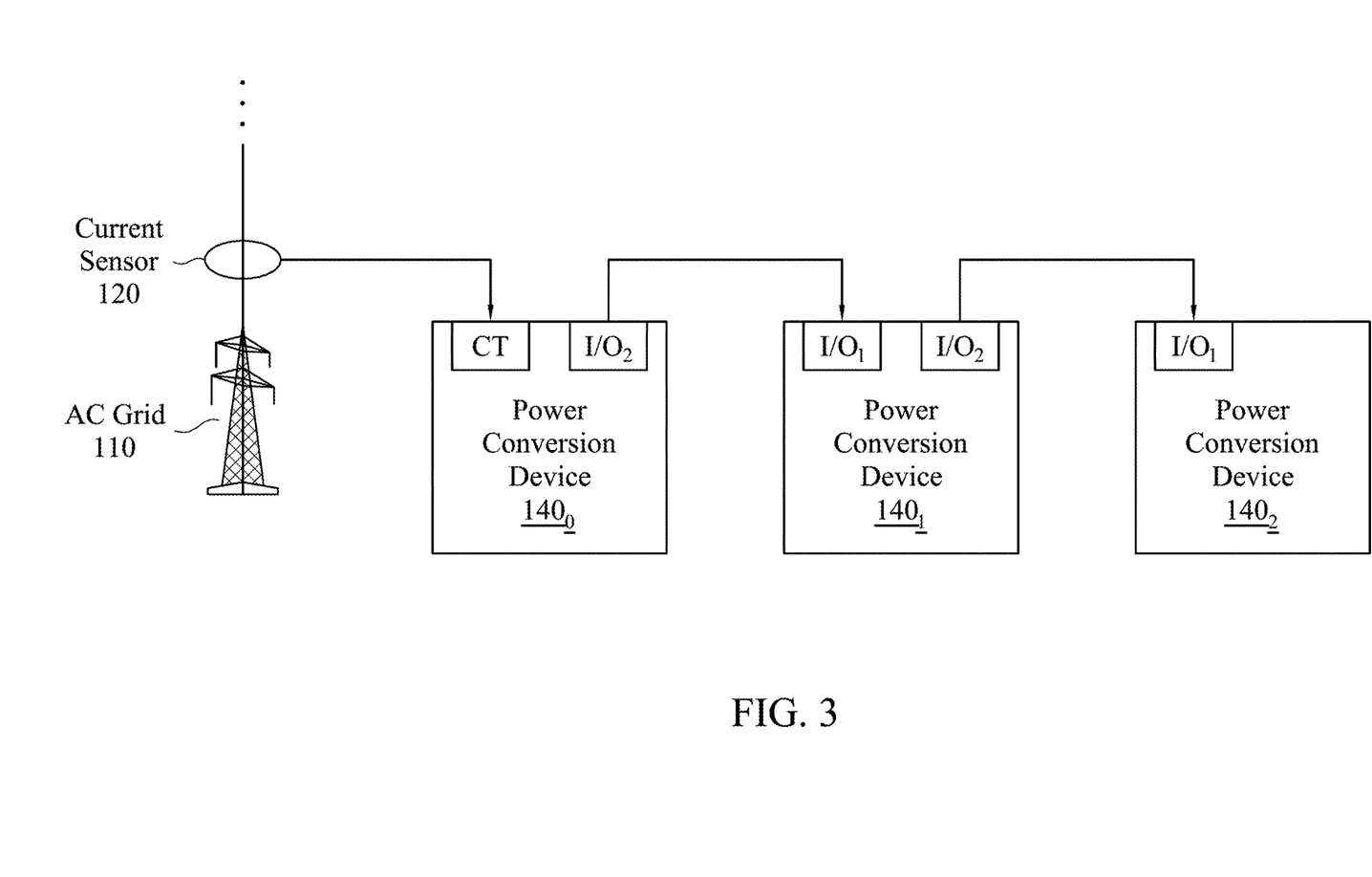
FIG. 3 illustrates a block diagram of the communication manner of the smart grid system according to some embodiments of the present invention.

FIG. 3 illustrates a block diagram of the communication manner of the smart grid system 100 according to some embodiments of the present invention. As shown in FIG. 3, the master power conversion device $140_0$ and the slave power conversion devices $140_1$ and $140_2$ are communicated via a daisy chain connection. In other words, each power conversion device is serially connected to the adjacent power conversion device(s) through the corresponding I/O terminal(s) $I/O_1$ and/or $I/O_2$. For example, the master power conversion device $140_0$ is serially connected to the slave power conversion device $140_1$ through the I/O terminal $I/O_2$ of the master power conversion device $140_0$ and the I/O terminal $I/O_1$ of the slave power conversion device $140_1$, and the slave power conversion device $140_1$ is sequentially serially connected to the slave power conversion device $140_2$ through the I/O terminal $I/O_2$ of the slave power conversion device $140_1$ and the I/O terminal $I/O_1$ of the slave power conversion device $140_2$. Referring to FIGS. 2a, 2b, 2c, and 3, in some embodiments of the present invention, the current measuring terminal CT of the master power conversion device $140_0$ is configured to receive the measured current value measured by the current sensor 120. The microcontroller 15 of the master power conversion device $140_0$ is configured to control/regulate the output power of the master power conversion device $140_0$ according to the measured current value outputted by the current sensor 120. In addition, the microcontroller 15 of the master power conversion device $140_0$ is further configured to provide a first duty cycle signal (through the I/O terminal $I/O_2$ of the master power conversion device $140_0$) to the slave power conversion device $140_1$ which is connected to the master power conversion device $140_0$ according to the measured current value outputted by the current sensor 120.

The I/O terminal $I/O_1$ of the slave power conversion device $140_1$ is configured to receive the first duty cycle signal provided by the master power conversion device $140_0$, and the microcontroller 15 of the slave power conversion device $140_1$ is configured to control/regulate the output power of the slave power conversion device $140_1$ according to the first duty cycle signal. In addition, the microcontroller 15 of the slave power conversion device $140_1$ is further configured to provide a second duty cycle signal (through the I/O terminal $I/O_2$ of the slave power conversion device $140_1$) to the slave power conversion device $140_2$ which is connected to the slave power conversion device $140_1$ according to the first duty cycle signal.

The I/O terminal $I/O_1$ of the slave power conversion device $140_2$ is configured to receive the second duty cycle signal provided by the slave power conversion device $140_1$, and the microcontroller 15 of the slave power conversion device $140_2$ is configured to control/regulate the output power of the slave power conversion device $140_2$ according to the second duty cycle signal.

In some embodiments of the present invention, each of the aforementioned first duty cycle signal and the aforementioned second duty cycle signal is square wave signal with 0% to 100% duty ratio (i.e., duty cycle), and the aforementioned square wave signal is generated by modulating a square wave with pulse width modulation. In some embodiments of the present invention, the output power of the slave power conversion device $140_1$ increase with the duty ratio of the first duty cycle signal. In other words, when the master power conversion device $140_0$ increases the duty ratio of the first duty cycle signal, the output power of the slave power conversion device $140_1$ increases accordingly; when the master power conversion device $140_0$ decreases the duty ratio of the first duty cycle signal, the output power of the slave power conversion device $140_1$ decreases accordingly. In some embodiments of the present invention, the output power of the slave power conversion device $140_2$ increase with the duty ratio of the second duty cycle signal. In other words, when the slave power conversion device $140_1$ increases the duty ratio of the second duty cycle signal, the output power of the slave power conversion device $140_2$ increases accordingly; when the slave power conversion device $140_1$ decreases the duty ratio of the second duty cycle signal, the output power of the slave power conversion device $140_2$ decreases accordingly. However, the trends between the duty ratio of the first/second duty cycle signal and the output power are not limited thereto, for example, the opposite configuration may be set, that is, the greater the duty ratio of the first/second duty cycle signal, the lower the output power.

In comparison with the conventional smart grid system, the smart grid system 100 of some embodiments of the present invention does not require an additional monitoring system to monitor the electrical information of the main path and to perform electric power dispatching on each power conversion device through the WiFi communication manner, the RS-485 communication manner, or the CAN bus communication manner. That is, the smart grid system 100 of some embodiments of the present invention does not need to configure complicated peripheral lines, and thus the smart grid system 100 can not only reduce the cost for installing the smart grid system, but also reduce the labor costs and time costs for maintaining the smart grid system. The smart grid system 100 reduces the dense line configuration, thereby reducing the electromagnetic interference and reducing the loss of power transmission. That is, the smart grid system 100 can save labor costs and time costs, and the smart grid system 100 can simplify the configuration of peripheral lines, and the smart grid system 100 can reduce the electromagnetic interference, and the smart grid system 100 can reduce the hardware costs.

In addition, in comparison with the conventional smart grid system, the smart grid system 100 of some embodiments of the present invention does not transmit commands to each power conversion device via the monitoring system through WiFi communication manner, the RS-485 communication manner, or the CAN bus communication manner. The master power conversion device $140_0$ and the slave power conversion devices $140_1$ and $140_2$ of the smart grid system 100 are communicated via the daisy chain connection. The master power conversion device $140_0$ and the slave power conversion devices $140_1$ and $140_2$ of the smart grid system 100 transmit commands (i.e., the first/second duty cycle signal) through the corresponding I/O terminal(s) $I/O_1$ and/or $I/O_2$ via the daisy chain connection. This daisy chain communication manner is independent for two adjacent power conversion devices, and the transmitted command is provided by the previous power conversion device, thereby avoiding redundancy time delays of transmission, waiting, receiving, and polling during the communication period. Specifically, the smart grid system 100 has a relatively less time delay, such that the power company may be able to respond immediately and could regulate power within the stipulated time, thereby complying current regulatory requirements.

Figure 4:
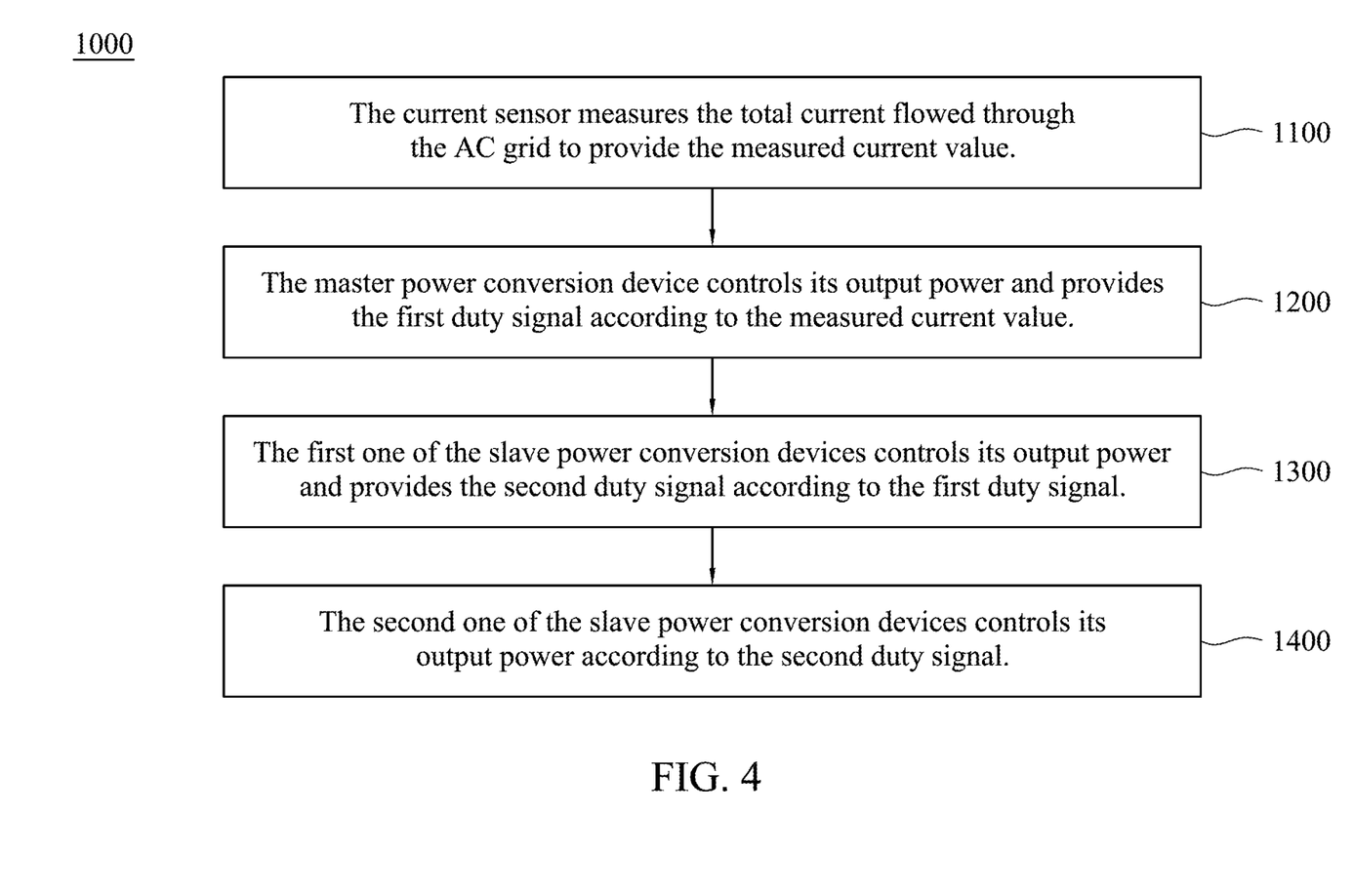
FIG. 4 illustrates a flow chart of a power management method of the smart grid system according to some embodiments of the present invention.

FIG. 4 illustrates a flow chart of a power management method 1000 of the smart grid system 100 according to some embodiments of the present invention. Referring to FIG. 1 and FIG. 4, the power management method 1000 includes steps 1100-1400. In step 1100, the current sensor 120 of the smart grid system 100 measures the total current flowed through the AC grid 110 and to correspondingly provides the measured current value. Then, in step 1200, the master power conversion device $140_0$ receives the measured current value measured from the current sensor 120, and the master power conversion device $140_0$ controls the output power of the master power conversion device $140_0$ according to the measured current value outputted by the current sensor 120, and the master power conversion device $140_0$ provides the first duty cycle signal to the slave power conversion device $140_1$ which is connected to the master power conversion device $140_0$ according to the measured current value outputted by the current sensor 120. Then, in step 1300, the slave power conversion device $140_1$ receives the first duty cycle signal provided by the master power conversion device $140_0$, and the slave power conversion device $140_1$ controls the output power of the slave power conversion device $140_1$ according to the first duty cycle signal, and the slave power conversion device $140_1$ further provides the second duty cycle signal to the slave power conversion device $140_2$ which is connected to the slave power conversion device $140_1$ according to the first duty cycle signal. Then, in step 1400, the slave power conversion device $140_2$ receives the second duty cycle signal provided by the slave power conversion device $140_1$, and the slave power conversion device $140_2$ controls the output power of the slave power conversion device $140_2$ according to the second duty cycle signal.

Figure 5:
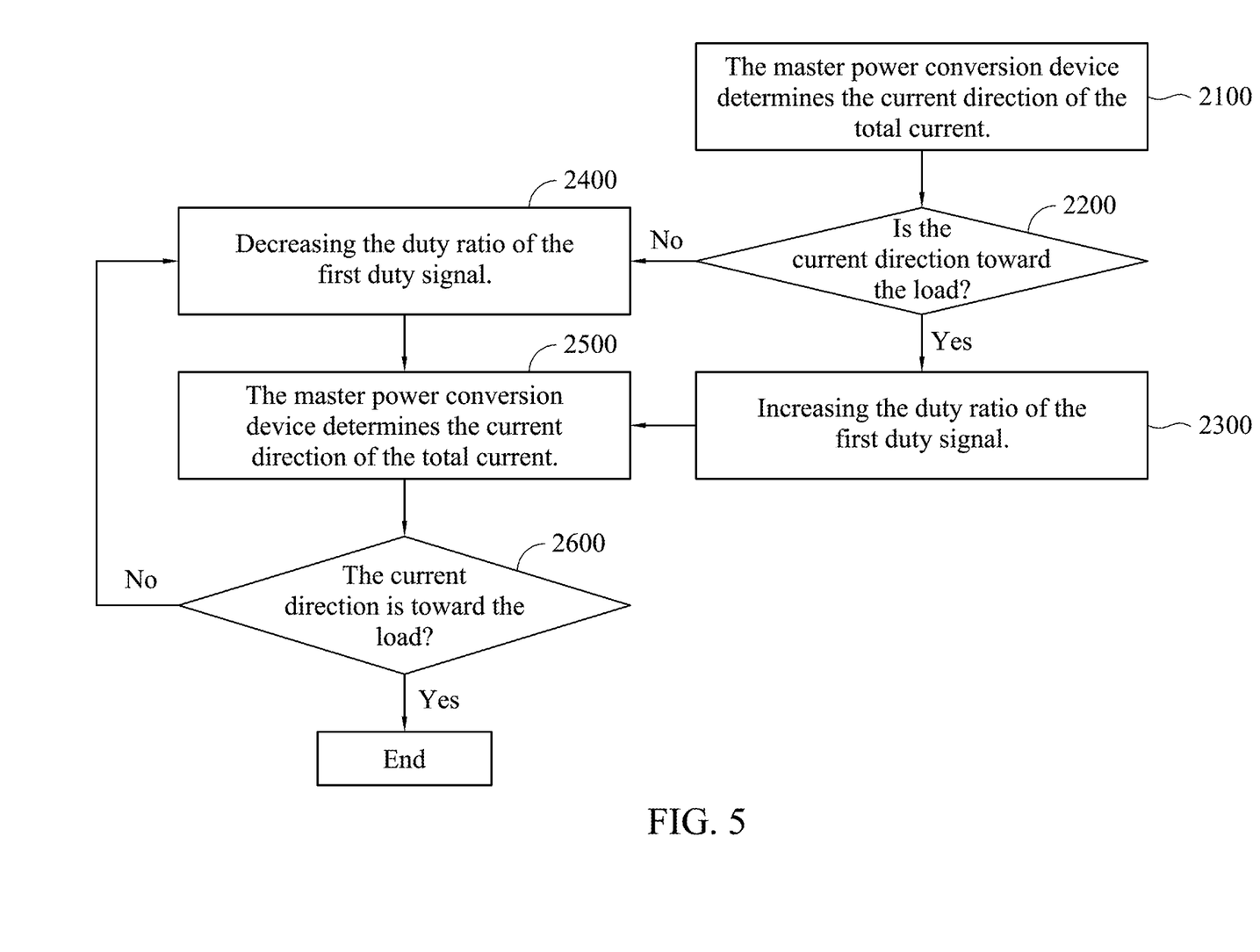
FIG. 5 illustrates a flow chart of a first application example of the power regulating manner of the master power conversion device and the slave power conversion device of the smart grid system according to some embodiments of the present invention.

FIG. 5 illustrates a flow chart of a first application example of the power regulating manner of the master power conversion device $140_0$ and the slave power conversion device $140_1$ of the smart grid system 100 according to some embodiments of the present invention. As shown in FIG. 5, in step 2100, the master power conversion device $140_0$ receives the measured current value from the current sensor 120 of the smart grid system 100, and the master power conversion device $140_0$ determines the current direction of the total current flowed through the AC grid 110 according to the measured current value. Then, in step 2200, the master power conversion device $140_0$ determines whether the current direction of the total current flowed through the AC grid 110 is toward the load 130. If the current direction of the total current flowed through the AC grid 110 is toward the load 130, it can be understood that the electric output power provided by all of the power conversion devices is not enough for the load 130. When the master power conversion device $140_0$ determines that the current direction of the total current flowed through the AC grid 110 is toward the load 130, the process advances to step 2300. When the master power conversion device $140_0$ determines that the current direction of the total current flowed through the AC grid 110 is not toward the load 130, the process advances to step 2400. In step 2300, the master power conversion device $140_0$ increases the output power of the master power conversion device $140_0$, and the master power conversion device $140_0$ increases the duty ratio of the first duty cycle signal such that the output power of the slave power conversion device $140_1$ increases correspondingly, and then the process advances to step 2500. In step 2400, the master power conversion device $140_0$ decreases the output power of the master power conversion device $140_0$, and the master power conversion device $140_0$ decreases the duty ratio of the first duty cycle signal such that the output power of the slave power conversion device $140_1$ decreases correspondingly, and then the process advances to step 2500. In step 2500, the master power conversion device $140_0$ receives the measured current value from the current sensor 120 again, and the master power conversion device $140_0$ determines the current direction of the total current flowed through the AC grid 110 according to the measured current value again. Then, in step 2600, the master power conversion device $140_0$ determines whether the current direction of the total current flowed through the AC grid 110 is toward the load 130 again. When the master power conversion device $140_0$ determines that the current direction of the total current flowed through the AC grid 110 is toward the load 130, the master power conversion device $140_0$ does not adjust the duty ratio of the first duty cycle signal. When the master power conversion device $140_0$ determines that the current direction of the total current flowed through the AC grid 110 is not toward the load 130, the process returns to step 2400.

Specifically, the first application example of the power regulating manner of the master power conversion device 140$_0$ and the slave power conversion device 140$_1$ of the smart grid system 100 as shown in FIG. 5 is an application example that the output power outputted by the power conversion device(s) is only supplied to the load 130 and not supplied to the AC grid 110. That is, the first application example is an application example for self-regulation that the users do not want to sell electricity (i.e., the supplying power is only for their own use). In this first application example, the master power conversion device 140$_0$ controls the output power of the master power conversion device 140$_0$ according to the current direction of the total current flowed through the AC grid 110. Moreover, the master power conversion device 140$_0$ adjusts the duty ratio of the first duty cycle signal according to the current direction of the total current flowed through the AC grid 110, thereby regulating the output power of the slave power conversion device 140$_1$.

Figure 6:
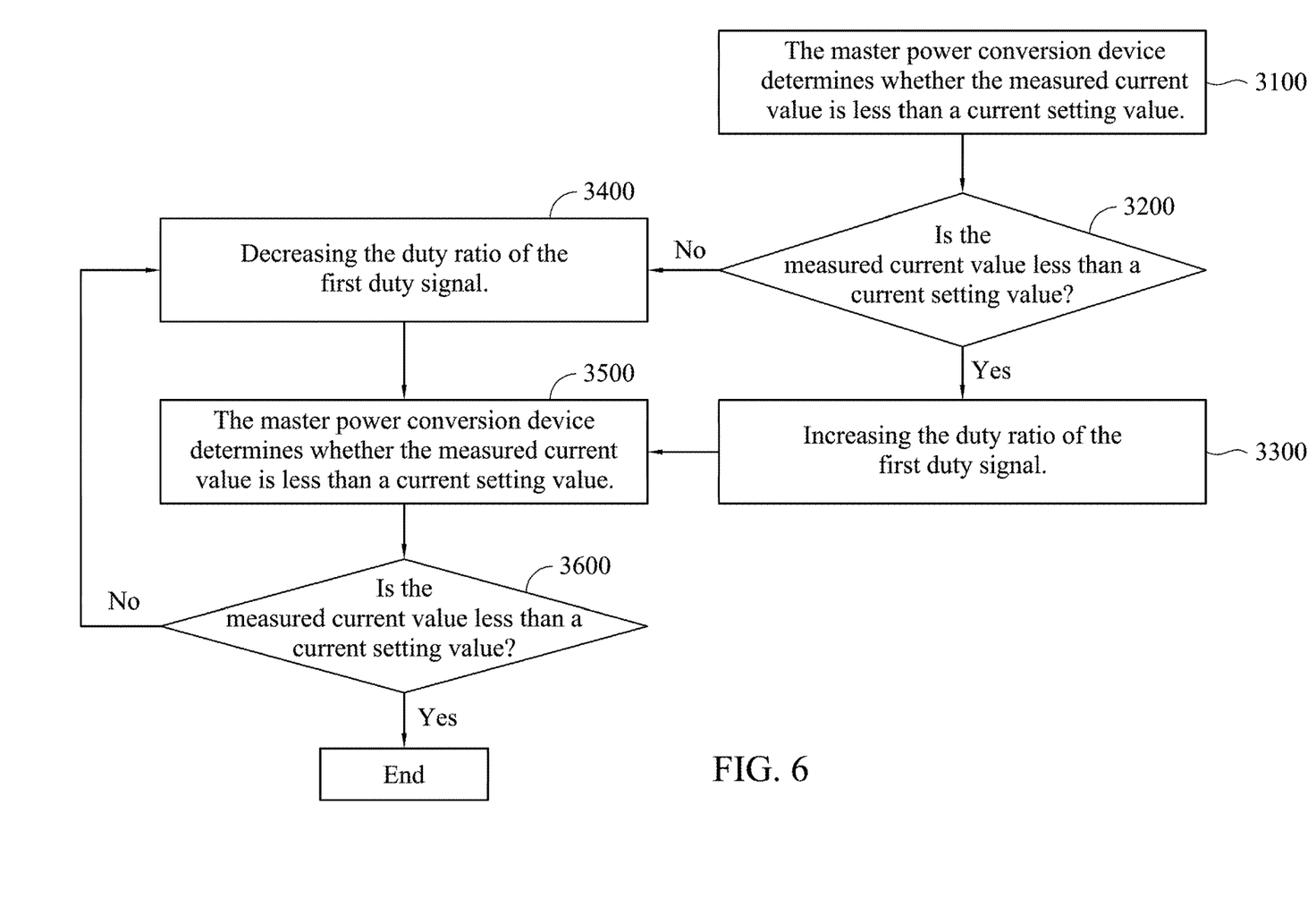
FIG. 6 illustrates a flow chart of a second application example of the power regulating manner of the master power conversion device and the slave power conversion device of the smart grid system according to some embodiments of the present invention.

FIG. 6 illustrates a flow chart of a second application example of the power regulating manner of the master power conversion device 140$_0$ and the slave power conversion device 140$_1$ of the smart grid system 100 according to some embodiments of the present invention. As shown in FIG. 6, in step 3100, the master power conversion device 140$_0$ receives the measured current value from the current sensor 120 of the smart grid system 100, and the master power conversion device 140$_0$ determines whether the measured current value is less than a current setting value. The current setting value is, for example, a current threshold value set by the operator or a current threshold value transmitted to the master power conversion device 140$_0$ through any device. Then, in step 3200, when the master power conversion device 140$_0$ determines that the measured current value is less than the current setting value, the process advances to step 3300. When the master power conversion device 140$_0$ determines that the measured current value is not less than the current setting value, the process advances to step 3400. In step 3300, the master power conversion device 140$_0$ increases the output power of the master power conversion device 140$_0$, and the master power conversion device 140$_0$ increases the duty ratio of the first duty cycle signal such that the output power of the slave power conversion device 140$_1$ increases correspondingly, and then the process advances to step 3500. In step 3400, the master power conversion device 140$_0$ decreases the output power of the master power conversion device 140$_0$, and the master power conversion device 140$_0$ decreases the duty ratio of the first duty cycle signal such that the output power of the slave power conversion device 140$_1$ decreases correspondingly, and then the process advances to step 3500. In step 3500, the master power conversion device 140$_0$ receives the measured current value from the current sensor 120 again, and the master power conversion device 140$_0$ determines whether the measured current value is less than the current setting value again. Then, in step 3600, when the master power conversion device 140$_0$ determines that the measured current value is less than the current setting value, the master power conversion device 140$_0$ does not adjust the duty ratio of the first duty cycle signal. When the master power conversion device 140$_0$ determines that the measured current value is not less than the current setting value, the process returns to step 3400.

Specifically, the second application example of the power regulating manner of the master power conversion device 140$_0$ and the slave power conversion device 140$_1$ of the smart grid system 100 as shown in FIG. 6 is an application example that the smart grid system 100 limits the energy outputted to the AC grid 110 by setting the current setting value. In other words, the second application example is an application example that the output power outputted by the power conversion device is allowed to supply to AC grid 110. That is, the second application example is an application example for self-regulation that the users sell electricity to the power company. In this second application example, the master power conversion device 140$_0$ controls the output power of the master power conversion device 140$_0$ by determining whether the measured current value is less than the current setting value. Moreover, the master power conversion device 140$_0$ adjusts the duty ratio of the first duty cycle signal by determining whether the measured current value is less than the current setting value, thereby regulating the output power of the slave power conversion device 140$_1$. The difference between the first application example and the second application example is the corresponding current setting value. The first application example sets the current setting value, thereby avoiding the output power supplied to the AC grid 100. The second application example adjusts the current setting value according to the requirement, thereby allowing the output power supplies to the AC grid 100.

Figure 7:
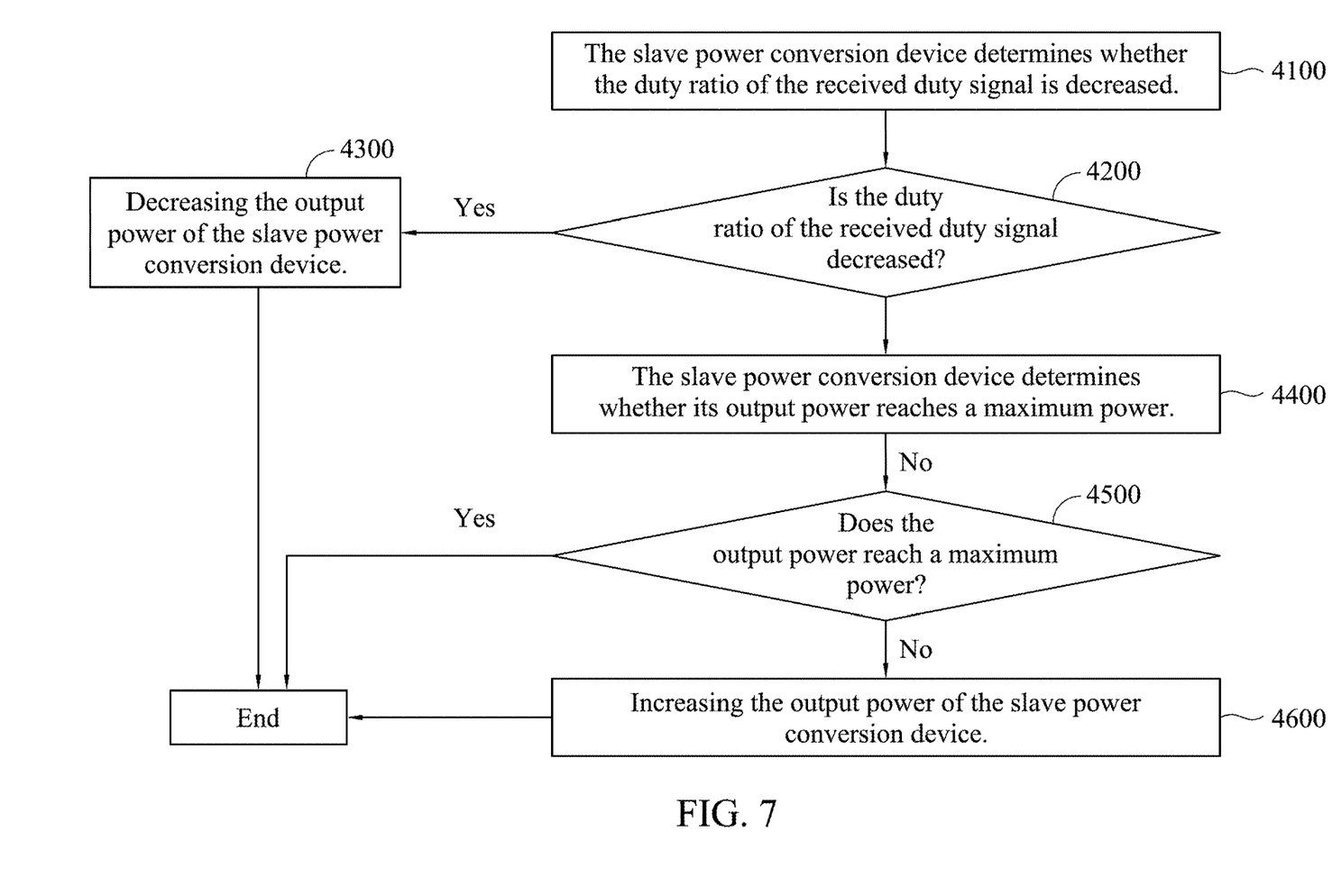
FIG. 7 illustrates a flow chart of a third application example of the power self-regulation manner of the slave power conversion device of the smart grid system according to some embodiments of the present invention.

FIG. 7 illustrates a flow chart of a third application example of the power self-regulation manner of the slave power conversion device 140$_1$/140$_2$ of the smart grid system 100 according to some embodiments of the present invention. As shown in FIG. 7, in step 4100, the slave power conversion device of the smart grid system 100 determines whether the duty ratio of the received duty cycle signal is decreased. For example, the slave power conversion device 140$_1$ determines whether the duty ratio of the first duty cycle signal received by the slave power conversion device 140$_1$ is decreased. For example, the slave power conversion device 140$_2$ determines whether the duty ratio of the second duty cycle signal received by the slave power conversion device 140$_2$ is decreased. Then, in step 4200, when the slave power conversion device determines that the duty ratio of the received duty cycle signal is decreased, the process advances to step 4300. When the slave power conversion device determines that the duty ratio of the received duty cycle signal is not decreased, the process advances to step 4400. In step 4300, the slave power conversion device decreases its output power. For example, when the slave power conversion device 140$_1$ determines that the duty ratio of the first duty cycle signal is decreased, the slave power conversion device 140$_1$ decreases the output power of the slave power conversion device 140$_1$, and the slave power conversion device 140$_1$ decreases the duty ratio of the second duty cycle signal. For example, when the slave power conversion device 140$_2$ determines that the duty ratio of the second duty cycle signal is decreased, the slave power conversion device 140$_2$ decreases the output power of the slave power conversion device 140$_2$. In step 4400, the slave power conversion device determines whether its output power reaches a maximum power of the slave power conversion device, and the process advances to step 4500. For example, the slave power conversion device 140$_1$ determines whether the output power of the slave power conversion device 140$_1$ reaches a maximum power of the slave power conversion device 140$_1$. For example, the slave power conversion device 140$_2$ determines whether the output power of the slave power conversion device $140_2$ reaches a maximum power of the slave power conversion device $140_2$. In step 4500, when the slave power conversion device determines that its output power reaches a maximum power of the slave power conversion device, the slave power conversion device does not adjust its output power. When the slave power conversion device determines that its output power does not reach a maximum power of the slave power conversion device, the process advances to step 4600. In step 4600, the slave power conversion device increases its output power. For example, when the slave power conversion device $140_1$ determines that the output power of the slave power conversion device $140_1$ does not reach a maximum power of the slave power conversion device $140_1$, the slave power conversion device $140_1$ increases the output power of the slave power conversion device $140_1$, and the slave power conversion device $140_1$ increases the duty ratio of the second duty cycle signal. For example, when the slave power conversion device $140_2$ determines that the output power of the slave power conversion device $140_2$ does not reach a maximum power of the slave power conversion device $140_2$, the slave power conversion device $140_2$ increases the output power of the slave power conversion device $140_2$.

Specifically, the third application example of the power self-regulation manner of the slave power conversion device $140_1/140_2$ of the smart grid system 100 as shown in FIG. 7 describes that the slave power conversion device $140_1/140_2$ adjusts its output power according to the duty ratio of the first/second duty cycle signal and a maximum power of the slave power conversion device $140_1/140_2$.

It is worth mentioning that, in some embodiments of the present invention, in order to comply current regulatory requirements, the output power of each power conversion device needs to be decreased within a stipulated time, such that the output power of each power conversion device is not supplied to the AC grid. Therefore, the smart grid system of some embodiments of the present invention allows the output power of each power conversion device to be increased at a relatively slow speed, and the output powers of the power conversion devices can be simultaneous increased at the same time or individually increased in different times. However, in order to comply current regulatory requirements, the smart grid system of some embodiments of the present invention is required to decrease the output power of each power conversion device at a relatively fast speed, such that the output power of each power conversion device can be decreased immediately. The smart grid system of some embodiments of the present invention balances its own power grid through the aforementioned mechanism.

From the above description, the present invention discloses a smart grid system and a power management method thereof. The master power conversion device is configured, such that the master power conversion device is used as the basis for power dispatching or power management according to the measured current value of the total current flowed through the AC grid, thereby regulating the output power of each of the power conversion devices, so as to realize the control, integration and management of the power information of the smart grid system and comply current regulatory requirements.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A smart grid system, applied to a load and an AC grid, wherein the smart grid system comprises:
    a current sensor configured to measure a total current flowed through the AC grid and to correspondingly provide a measured current value; and
    a plurality of power conversion devices coupled to the AC grid and configured to supply power to the load, wherein the power conversion devices comprise:
        a master power conversion device configured to receive the measured current value, wherein the master power conversion device controls an output power of the master power conversion device and provides a first duty cycle signal according to the measured current value; and
        a plurality of slave power conversion devices, wherein a first one of the slave power conversion devices which is coupled to the master power conversion device is configured to receive the first duty cycle signal, wherein the first one of the slave power conversion devices controls an output power of the first one of the slave power conversion devices according to the first duty cycle signal;
    wherein the master power conversion device and the slave power conversion devices are communicated via a daisy chain connection.

2. The smart grid system of claim 1, wherein the first one of the slave power conversion devices further provides a second duty cycle signal according to the first duty cycle signal.

3. The smart grid system of claim 2, wherein a second one of the slave power conversion devices which is coupled to the first one of the slave power conversion devices is configured to receive the second duty cycle signal, wherein the second one of the slave power conversion devices controls an output power of the second one of the slave power conversion devices according to the second duty cycle signal.

4. The smart grid system of claim 2, wherein each of the power conversion devices comprises:
    a DC input terminal configured to receive a DC power;
    an AC output terminal configured to output the output power, wherein the output power is an AC power; and
    a microcontroller configured to control the output power converted from the DC power.

5. The smart grid system of claim 4, wherein each of the power conversion devices further comprises a current measuring terminal, where the current measuring terminal of the master power conversion device is configured to receive the measured current value.

6. The smart grid system of claim 4, wherein the microcontroller of the master power conversion device is configured to control the output power outputted by the AC output terminal of the master power conversion device according to the measured current value.

7. The smart grid system of claim 4, wherein each of the power conversion devices further comprises an I/O (input/output) terminal, wherein the I/O terminal of the master power conversion device is configured to provide the first duty cycle signal, wherein the I/O terminal of the first one of the slave power conversion devices is configured to provide the second duty cycle signal.

8. The smart grid system of claim 4, wherein the microcontroller of the first one of the slave power conversion devices is configured to control the output power outputted by the AC output terminal of the first one of the slave power conversion devices according to the first duty cycle signal.

9. The smart grid system of claim 1, wherein the master power conversion device determines a current direction of the total current according to the measured current value, and the master power conversion device controls the output power of the master power conversion device and provides the first duty cycle signal according to the current direction of the total current.

10. The smart grid system of claim 1, wherein the master power conversion device controls the output power of the master power conversion device and provides the first duty cycle signal by determining whether the measured current value is less than a current setting value.

11. A power management method of a smart grid system, comprising:
measuring a total current flowed through a AC grid to provide a measured current value;
receiving the measured current value through a master power conversion device of a plurality of power conversion devices coupled to the AC grid, wherein the master power conversion device controls an output power of the master power conversion device and provides a first duty cycle signal according to the measured current value; and
receiving the first duty cycle signal through a first one of a plurality of slave power conversion devices of the power conversion devices which is coupled to the master power conversion device, wherein the first one of the slave power conversion devices controls an output power of the first one of the slave power conversion devices according to the first duty cycle signal;
wherein the power conversion devices are configured to supply power to a load, wherein the master power conversion device and the slave power conversion devices are communicated via a daisy chain connection.

12. The power management method of claim 11, wherein the first one of the slave power conversion devices further provides a second duty cycle signal according to the first duty cycle signal.

13. The power management method of claim 12, further comprising:
receiving the second duty cycle signal through a second one of the slave power conversion devices which is coupled to the first one of the slave power conversion devices, wherein the second one of the slave power conversion devices controls an output power of the second one of the slave power conversion devices according to the second duty cycle signal.

14. The power management method of claim 11, wherein the master power conversion device determines a current direction of the total current according to the measured current value, and the master power conversion device controls the output power of the master power conversion device and provides the first duty cycle signal according to the current direction of the total current.

15. The power management method of claim 14, wherein when the current direction of the total current is toward the load, the master power conversion device increases a duty ratio of the first duty cycle signal;
when the current direction of the total current is not toward the load, the master power conversion device decreases the duty ratio of the first duty cycle signal.

16. The power management method of claim 15, wherein after increasing or decreasing the duty ratio of the first duty cycle signal, the master power conversion device determines the current direction of the total current again;
when the current direction of the total current is toward the load, the master power conversion device does not adjust the duty ratio of the first duty cycle signal;
when the current direction of the total current is not toward the load, the master power conversion device decreases the duty ratio of the first duty cycle signal.

17. The power management method of claim 11, wherein the master power conversion device controls the output power of the master power conversion device and provides the first duty cycle signal by determining whether the measured current value is less than a current setting value.

18. The power management method of claim 17, wherein when the measured current value is less than the current setting value, the master power conversion device increases a duty ratio of the first duty cycle signal;
when the measured current value is not less than the current setting value, the master power conversion device decreases the duty ratio of the first duty cycle signal.

19. The power management method of claim 18, wherein after increasing or decreasing the duty ratio of the first duty cycle signal, the master power conversion device determines whether the measured current value is less than the current setting value again;
when the measured current value is less than the current setting value, the master power conversion device does not adjust the duty ratio of the first duty cycle signal;
when the measured current value is not less than the current setting value, the master power conversion device decreases the duty ratio of the first duty cycle signal.

20. The power management method of claim 18, wherein the first one of the slave power conversion devices determines whether the duty ratio of the first duty cycle signal is decreased;
when the duty ratio of the first duty cycle signal is decreased, the first one of the slave power conversion devices decreases the output power of the first one of the slave power conversion devices;
when the duty ratio of the first duty cycle signal is not decreased, the first one of the slave power conversion devices determines whether the output power of the first one of the slave power conversion devices reaches a maximum power of the first one of the slave power conversion devices;
when the output power of the first one of the slave power conversion devices reaches the maximum power of the first one of the slave power conversion devices, the first one of the slave power conversion devices does not adjust the output power of the first one of the slave power conversion devices;
when the output power of the first one of the slave power conversion devices does not reach the maximum power of the first one of the slave power conversion devices, the first one of the slave power conversion devices increases the output power of the first one of the slave power conversion devices.

* * * * *